United States Patent [19]

Armor et al.

[11] Patent Number: 4,469,816

[45] Date of Patent: Sep. 4, 1984

[54] PALLADIUM ON ALUMINA AEROGEL CATALYST COMPOSITION AND PROCESS FOR MAKING SAME

[75] Inventors: John N. Armor, Morris Plains; Emery J. Carlson, Chatham, both of N.J.

[73] Assignee: Allied Corporation, Morris Township, Morris County, N.J.

[21] Appl. No.: 449,720

[22] Filed: Dec. 14, 1982

[51] Int. Cl.$^3$ .................... B01J 21/04; B01J 23/44
[52] U.S. Cl. .................................................. 502/333
[58] Field of Search ................ 252/466 PT; 502/333

[56] References Cited

U.S. PATENT DOCUMENTS 3,136,818  6/1964  Sperber et al. ............... 242/441 X
3,963,646  6/1976  Teichner et al. ................... 252/459
4,265,834  5/1981  Birkenstock et al. ............... 564/421

OTHER PUBLICATIONS

Meschke et al., "Palladium Catalysts IX, Kinetic Studies", J. Org. Chem., 1960, vol. 25, pp. 137-140.
Rylander et al., "Selectivity in Hydrogenation over Platinum Metal Catalysts: Nitro Aromatics", Ann. N.Y. Acad. Sci., 1970, vol. 172, pp. 266-275.
Teichner et al., "Inorganic Oxide Aerogels", Advances in Colloid and Interface Science, 1976, vol. 5, pp. 245-273.

Primary Examiner—W. J. Shine
Attorney, Agent, or Firm—Thomas D. Hoffman; Gerhard H. Fuchs

[57] ABSTRACT

A catalyst composition comprising a uniform dispersion of individual metallic palladium particles, substantially free of clusters of said particles, on and throughout an alumina aerogel support, said composition having a BET surface area in the range of about 20 to about 700 m$^2$/g, a pore volume in the range of about 1.5 to about 12 cm$^3$/g, a bulk density in the range of about 0.003 to about 0.5 g/cm$^3$ and having a Pd°/Al$_2$O$_3$ weight ratio of about 1:1000 to about 1:5 is disclosed. A process of preparing the catalyst composition having metallic palladium impregnated on alumina aerogel and a process of using same as a hydrogenation catalyst are also disclosed.

8 Claims, 8 Drawing Figures

1mm = 40Å
230 000X

1mm = 20Å

500 000X 230 000X

1mm 20Å
500 000X

PALLADIUM ON ALUMINA AEROGEL CATALYST COMPOSITION AND PROCESS FOR MAKING SAME

The invention relates to a catalyst composition comprising metallic palladium on an alumina-aerogel support and a process for making and using said catalyst. More particularly, this invention relates to a catalyst composition comprising a uniform dispersion of metallic palladium, in the form of individual metallic particles and substantially free of clusters of said particles, on an alumina aerogel support and having a BET surface area greater than 20 m²/g, and a pore volume greater than 1.5 cm³/g.

Palladium-containing supported catalysts useful for catalytic hydrogenation of compounds such as nitroaromatic compounds are generally known. See for example, U.S. Pat. No. 4,265,834 (Birkenstock et al.) which discloses a process for the catalytic hydrogenation of nitrobenzene to aniline in the gas phase using a multicomponent supported catalyst containing a metal from groups VIIIa, Ib and IIb such as palladium and one or more transition metals of Groups IVa, Va or VIa and optionally an additional transition group element or main group element of Groups IVb or Vb on an inert support such as $\alpha$-$Al_2O_3$ with a BET surface area of less than 20 m²/g which has been pretreated by the action of a base and subsequent drying prior to impregnation of said support with said noble metal and transition metal element.

The use of palladium impregnated on alumina as a hydrogenation catalyst is disclosed by P. N. Rylander et al. in *Ann. N.Y. Acad. Sci.*, 1970, Vol. 172, 266 and by R. W. Meschke et al. in *J. Org. Chem.*, 1960, vol. 25, 137.

Aerogels are mineral oxides having high surface areas, high pore volumes and low bulk densities and are prepared by removal of an organic solvent from a wet gel at a temperature above the critical temperature of the solvent. See the article entitled "Inorganic Oxide Aerogels" by S. J. Teichner et al. in *Advances in Colloid and Interface Science*, Volume 5, 1976 at pages 245–273. U.S. Pat. No. 3,963,646 (Teichner et al.) discloses a composite aerogel catalyst useful for gas phase hydrogenolysis of toluene at 325° C. and containing a selected zero valent metal of Group VIII such as iron, cobalt or nickel deposited on mineral oxide such as alumina, magnesia, silica or mixtures of alumina and magnesia.

SUMMARY OF THE INVENTION

In accordance with the present invention there is provided a catalyst composition comprising a uniform dispersion of individual particles of metallic palladium, substantially free of clusters of said particles, on an alumina aerogel support, said composition having a BET surface area in the range of about 20 to about 700 m²/g, a pore volume in the range of about 1.5 to about 12 cm³/g, a bulk density in the range of about 0.003 to about 0.5 g/cm³ and having a Pd°/$Al_2O_3$ weight ratio in the range of about 1:1000 to about 1:5.

DETAILED DESCRIPTION OF THE INVENTION AND THE PREFERRED EMBODIMENTS

The catalyst composition of the present invention is a uniform dispersion of individual metallic palladium particles impregnated onto and within and throughout an alumina aerogel support. The catalyst composition of the present invention is a kinetically more active (faster) than commercially available palladium on alumina catalysts in selective and complete hydrogen reductions of nitrobenzene to aniline, at room temperature and one atmosphere of hydrogen.

The catalyst composition of the present invention was prepared by hydrolysis of palladium (II) salts in the presence of hydrolyzable aluminum compounds and subsequent super-critical venting of solvent to produce a metallic palladium (in the reduced state) - alumina aerogel. Unlike the commercially available catalysts of similar composition, the catalyst compositions of the present invention produced in accordance with the procedure of the present invention contained metallic palladium, substantially free of catalytically inactive palladium(II) on the surface of the catalyst and as such may be used as a hydrogenation catalyst without extensive pretreatment. By the term "substantially free" of said palladium(II), as used herein, is meant no palladium(II) was detected on the surface of the palladium on the alumina aerogel catalyst of the present invention by X-ray photoelectron spectroscopy. See Table 1 for a summary of the results.

The morphology of the catalyst composition of the present invention is critical and more important than the BET surface area, pore volume or bulk density.

For the catalyst composition of the present invention, the preferred BET surface area is in the range of 20 to about 700 m²/g, the pore volume is in the range of about 1.5 to about 12 cm³/g, preferably about 2 to about 9 cm³/g, the bulk density is in the range of about 0.003 to about 0.5 g/cm³, preferably about 0.01 to about 0.2 g/cm³, and the Pd°/$Al_2O_3$ weight ratio is in the range of about 1:1000 to about 1:5, preferably about 1:100 to about 1:10.

Figure 1:
FIG. 1 is a transmission electron micrograph of a preferred embodiment of a catalyst composition of the present invention comprising 5 weight % Pd° on alumina aerogel support.

FIG. 1 is a transmission electron micrograph of a preferred embodiment of the palladium-on alumina aerogel catalyst that was prepared by the procedure described in Example 1 hereinbelow. The sample shown in FIG. 1 was ground between glass slides and then dusted onto grids coated with a holey carbon film and has a morphology consisting of individual metallic palladium particles having a diameter in the range of about 4 nm to about 30 nm, uniformly dispersed throughout the filmy matrix and substantially free of clusters of palladium particles.

Figure 2A:
FIGS. 2a and 2b are transmission electron micrographs (at two magnifications) of another preferred embodiment of a catalyst composition of the present invention comprising 5 weight % Pd° on an alumina aerogel support.
Figure 2B:

FIGS. 2a and 2b are transmission electron micrographs of another preferred embodiment of the catalyst composition of the present invention that was prepared in accordance with the procedure of Example 3 hereinbelow. The sample of the catalyst composition of FIGS. 2a and 2b was prepared as described for FIG. 1 and has a morphology consisting of a uniform dispersion of metallic palladium particles primarily having diameters in the range of about 2 nm to about 6 nm with occasional large metallic palladium particles up to about 10 nm in diameter and substantially free of much larger aggregates, i.e, clusters of metallic palladium particles on an alumina aerogel which is in the form of platelets with sharp corners suggesting crystallinity. It is believed that the uniformly narrower distribution of smaller metallic palladium particles shown in FIGS. 2a and 2b (compared to metallic palladium particles of the catalyst composition of FIG. 1) accounts for the better kinetic behavior of the catalyst composition of Example 3 reported in Table 2, even though the BET surface area of the total catalyst composition of Example 3 is smaller (134 m2/g) than that of Example 1 (329 m$^2$/g).

Figure 3A:
FIGS. 3a and 3b are transmission electron micrographs (at two magnifications) of commercially available catalyst compositions comprising 5 weight % Pd° on a powdered alumina support.
Figure 3B:
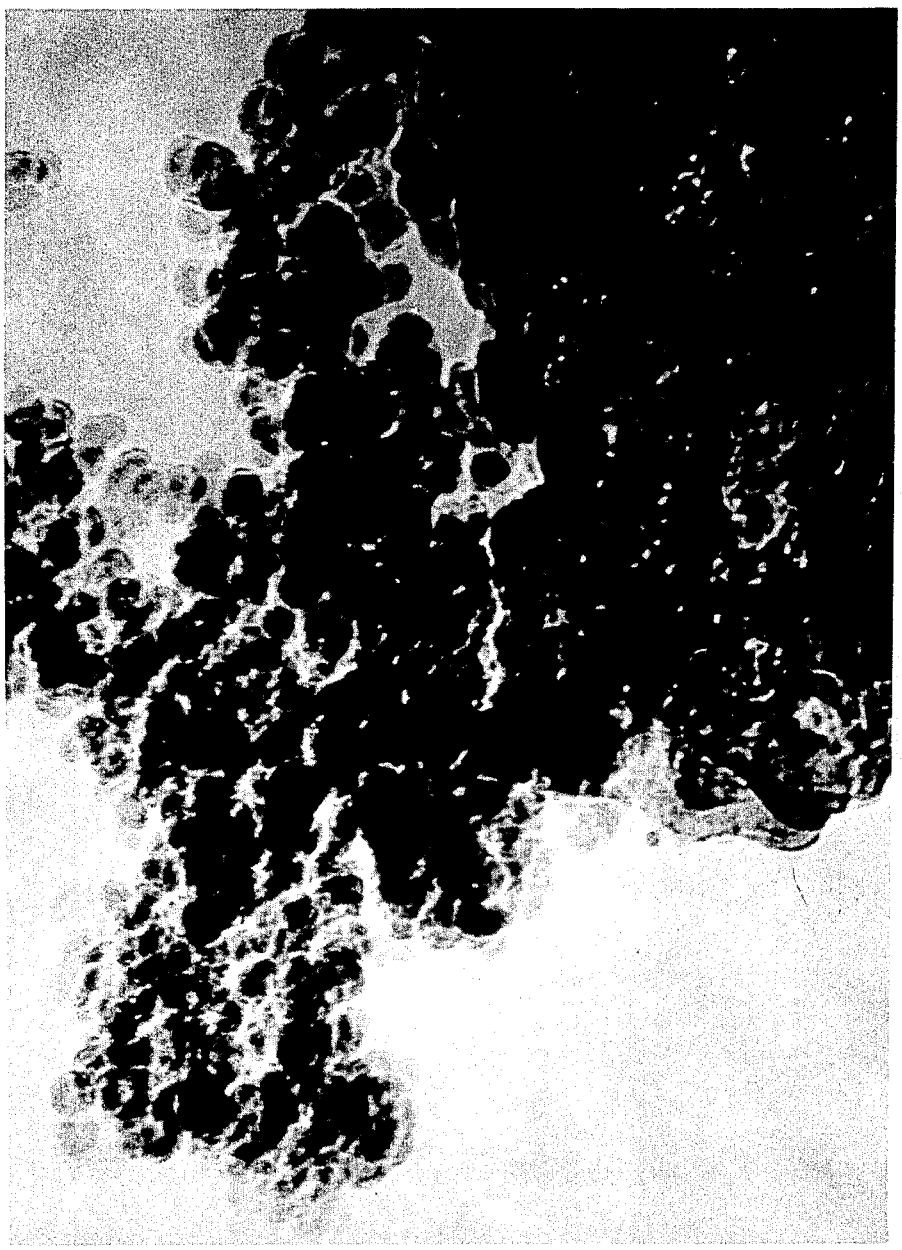

FIGS. 3a and 3b are transmission electron micrographs of a commercially available Oxy-Catalyst material containing 5 weight % Pd on powdered alumina support that were prepared for electron micrographic analysis by the same procedure as described for FIG. 1. The morphology of the catalyst of FIGS. 3a and 3b consists of amorphous areas with clusters of particles having diameters up to about 20 nm and crystalline areas with particles having diameters of about 4 nm. No individual palladium particles are observable in the samples of FIGS. 3a and 3b and the electron diffraction patterns thereof did not correspond to either $Al_2O_3$ or Pd°.

Figure 4A:
FIGS. 4a and 4b and 4c are transmission electron micrographs (at two magnifications) of commercially available catalyst compositions comprising 5 weight % Pd on a powdered alumina support.
Figure 4B:
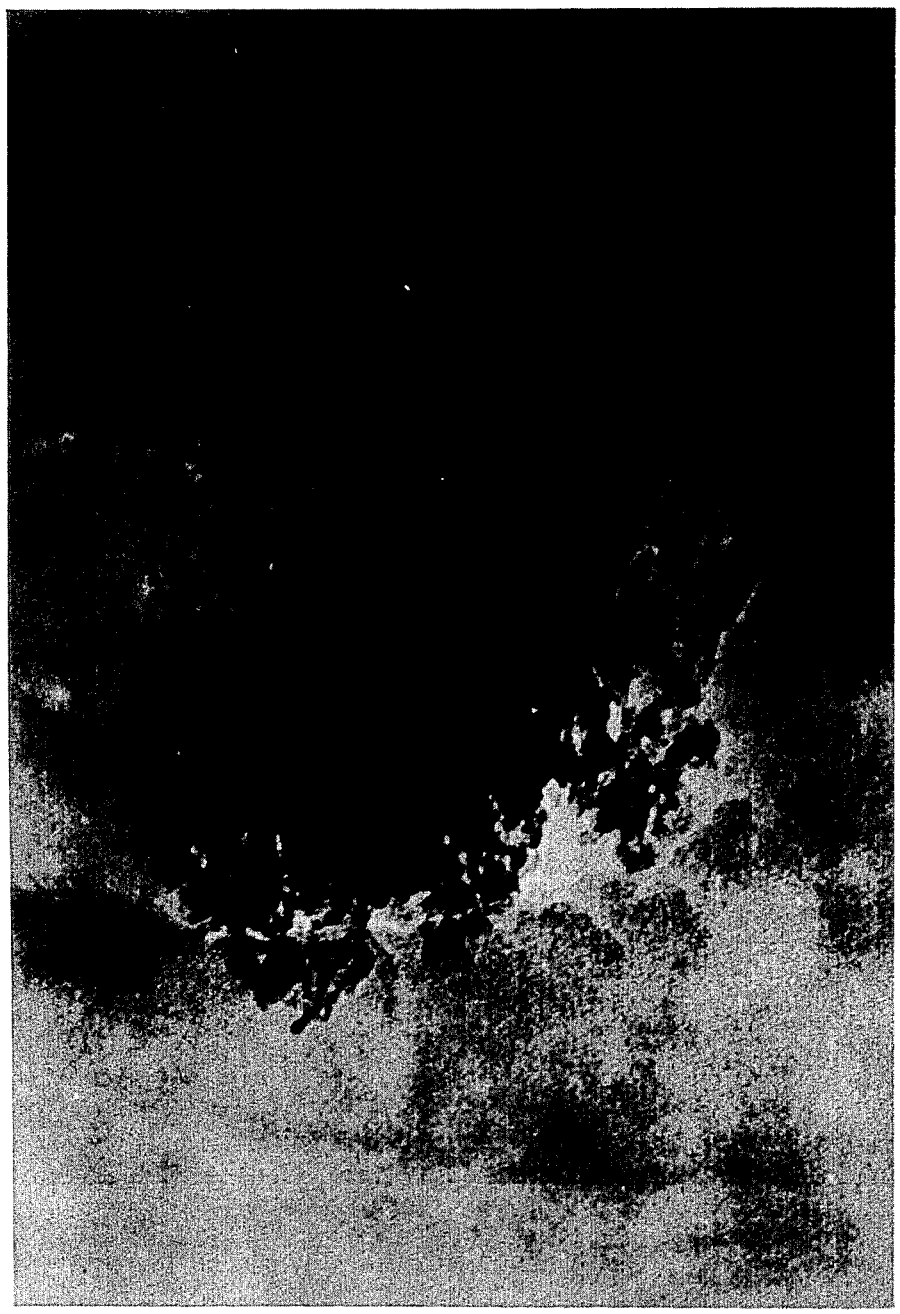
Figure 4C:

FIGS. 4a and 4b and 4c are transmission electron micrographs of a commercially available Engelhard catalyst containing 5 weight % palladium on a powdered alumina support. The samples in FIGS. 4a and 4b were prepared for analysis as described for FIG. 1 and have a morphology consisting of clusters of particles having diameters in the range of about 10 nm up to about 50 nm that are assumed to be palladium on the alumina support which is composed of both individual particles and platelets. The electron diffraction pattern showed the sample illustrated in FIGS. 4a and 4b and 4c was crystalline but no diffraction pattern for the metallic palladium was observed.

The metallic palladium, uniformly dispersed on, within and throughout the alumina aerogel matrix of the present invention, comprises individual particles having diameters in the range of about 0.2 nm to about 30 nm. Based on analysis by transmission electron microscopy (TEM), the preferred palladium on alumina aerogel catalyst composition of the present invention comprises an alumina aerogel support having a morophology comprising geometric platelets, substantially free of individual particles (within limits of detection by TEM) and metallic palladium, uniformly dispersed on, within and throughout the alumina aerogel support and consisting essentially of individual particles having diameters in the range of about 2 to about 6 nm (within limits of detection by TEM).

The catalyst composition of the present invention was prepared by intimately contacting a solution of a hydrolyzable palladium(II) compound such as palladium nitrate in an aprotic solvent such as acetone with a solution or dispersion of a hydrolyzable aluminum compound such as aluminum $C_1$-$C_8$ alkoxides in a $C_1$-$C_5$ alcohol for a time sufficient to form a mixture of said compounds substantially free of metallic palladium. Palladium(II) is readily reduced by $C_1$-$C_5$ alcohols such as for example methanol and dark particles of palladium metal form and coagulate in the alcohol phase. Reduction and coagulation are to be avoided since a catalyst composition produced containing clusters and agglomerates of metallic palladium particles is catalytically inferior to the catalyst composition of the present invention containing a uniform dispersion of individual metallic palladium particles, substantially free of clusters of said particles on an alumina aerogel support. Accordingly the combination of the hydrolyzable palladium(II) compound in an aprotic solvent and a solution or dispersion of a hydrolyzable aluminum compound in a $C_1$-$C_5$ alcohol was promptly, and before no more than incipient darkening indicative of reduction of palladium(II) to metallic palladium occurred, intimately contacted with a solution of a $C_1$-$C_5$ alcohol and water in an amount sufficient to hydrolyze the hydrolyzable aluminum compound and to form a substantially uniform dispersion of metallic palladium and the hydrolyzed aluminum compound in the presence of the $C_1$-$C_5$ alcohol-aprotic solvent mixture. The uniform dispersion is transferred to an autoclave of any convenient design and the temperature is raised above the critical temperature of the $C_1$-$C_5$ alcohol-aprotic solvent mixture and the solvent mixture is vented under super-critical conditions. The catalyst composition so formed is a uniform dispersion of metallic palladium on an alumina aerogel support and is substantially free of palladium(II), i.e., no palladium(II) was observed by X-ray photoelectron spectroscopy on the surface of the catalyst composition. Thus, the catalyst composition of the present invention may be used as a hydrogenation catalyst for a variety of organic compounds, in the gas or solution phase, such as nitro compounds, especially aromatic nitro compounds, alkynes and alkenes without extensive pretreatment with gaseous hydrogen at elevated temperature as required with commercially available Pd catalysts.

Among the palladium(II) compounds found useful in the process of the present invention are $Pd(O_2CCH_3)_2$, $Pd(NO_3)_2$, palladium acetylacetonate and $Pd(NH_3)_2(NO_2)$. The use of Pd(II) compounds such as Pd(II) halides whose counter ions, e.g., chloride, could become a poison to the catalyst composition are to be avoided.

Among the hydrolyzable aluminum compounds found useful in the process of the present invention are aluminum $C_1$-$C_8$ alkoxides, preferably aluminum $C_3$-$C_5$ sec-alkoxides. Aluminum sec-butoxide and aluminum isopropoxide are more preferred.

Among the aprotic solvents found useful in the process of the present invention are alkanones such as acetone, other ketones such as methyl ethyl ketone and alkanonitriles, such as acetonitrile.

During the course of the development of the catalyst composition of the present invention, nickel oxide aerogels disclosed in U.S. Pat. No. 3,963,646 (Teichner et al.) were prepared and found to be inactive catalysts for the reduction of nitrobenzene. See Table 3 for a summary of the results.

The examples which follow are illustrative of the present invention and of the best mode contemplated by us for practicing same, but are to be interpreted as illustrative and not as limiting.

EXPERIMENTAL

Example 1

A fresh solution of 0.32 palladium(II) acetate (Strem) was made up in 10 cc warm acetone (A). A separate, fresh solution of 14.7 g of aluminum secbutoxide (0.06 M) (Ventron) and 30 mL sec-butanol was prepared (B). Solutions A and B were combined to form a new quasi-stable solution (C). To a fresh solution of C was added a solution (D) of 6.5 mL of water in 60 mL of methanol which results in a viscous pasty gel (E). With manual stirring and warming to about 45° C., gel E thinned out to a syrup-like slurry which was stirred at 40° C. with a magnetic bar for about one hour to complete the hydrolysis. This mixture (in a "Pyrex" glass liner) was inserted into a 300 mL autoclave, purged with $N_2$ gas via pressure pulses, and heated well above the estimated critical temperature of the mixture to about 280°–290° C. The maximum pressure generated was about 1900 psig (13,093 kPa). The vapor phase was slowly vented off in its super-critical state to relieve the pressure. The autoclave, after final purging with $N_2$ gas, was cooled, yielding a dry brown-black Pd°-alumina aerogel, which was further dried at 110°–120° C. in air overnight. The BET surface area was 329 $m^2/g$, the pore volume was 4.8 $cm^3/g$ and the bulk density was 0.044 $g/cm^3$. See FIG. 1 for transmission electron micrograph of the dried aerogel. Surface analysis by X-ray photoelectron spectroscopy is reported in Table 1.

Example 2

The procedure of Example 1 was followed except that the amount of Pd acetate used was 0.128 g to give a calculated 2 weight % Pd° on alumina aerogel support. The BET surface area was 642 $m^2/g$, the pore volume was 6.5 $cm^3/g$.

Example 3

The apparatus of Example 1 was used and the amounts of Pd(II) and aluminum compounds were chosen to give an aerogel having 5 weight parts Pd° per 100 weight parts alumina. Palladium(II) acetate (0.32 g) (Strem #46-178) was dissolved readily in 10 mL warm acetone (solution A). The mixture was stirred with a magnetic bar in a closed glass vial in a slightly warm water bath. No immediate or fast reaction occurs, as occurred with isopropanol. Separately, 14.7 g of aluminum sec-butoxide (Petrarch) viscous liquid was dispersed into 75 mL of dry isopropanol in a Pyrex tube to give solution B. Separately a solution (C) of 25 mL isopropanol and 6.5 mL distilled water was prepared. Then solution A was poured and mixed into clear solution B. Promptly mild darkening began to occur. Promptly and before no more than incipient darkening had set in, solution C was poured and mixed into the combination of A and B. The mass promptly became pasty as the aluminum sec-butoxide hydrolyzed to an alumina gel and/or alumina-alkoxy gel as an intermediate. An expected co-product would be sec-butanol (liq). The thick mixture was stirred and further mixed by hand with a glass rod. The mixture (in the tube) was placed in a water bath at 45° C. Additional isopropanol (10 mL) was added. After several minutes the viscous mixture thinned out and assumed the state of an opaque syrup. Within approximately one hour, the tube (about ⅔–¾ full) and its contents were inserted into the autoclave of Example 1 which was purged with $N_2$ and then heated to 284°–290° C., a temperature above the critical temperature of the mixture. The maximum pressure generated was 2250 psig (15,505 kPa). The solvent mixture was slowly vented under super-critical conditions. The autoclave was purged with $N_2$ and cooled over a weekend. The (dark gray) Pd°-alumina aerogel was dried overnight in air at 110°–120° C. The BET surface area was 134 $m^2/g$, the pore volume was 2.8 $cm^3/g$, and the bulk density was 0.010 $g/cm^3$. See FIGS. 2a and 2b for transmission electron micrograph and Table 1 for surface analysis by X-ray photoelectron spectroscopy.

TABLE 1

Analysis of Oxidation State and Relative Surface Concentration of Various Palladium on Alumina Catalysts by X-ray Photoelectron Spectroscopy

| Catalyst | Palladium Oxidation State | Surface Pd/Al Ratio (Moles) |
|---|---|---|
| 5% Pd on $Al_2O_3$ powder[1] (Oxy) | $Pd^{+2}$ | 0.075 |
| Pd on $Al_2O_3$ powder[2] (Alpha) | $Pd^{+2}$ | 0.052 |
| 5% Pd on $Al_2O_3$ powder[3] (Engelhard) | Pd° | 0.065 |
| 5% Pd on Alumina aerogel[4] | Pd° | 0.009 |
| 5% Pd on Alumina aerogel[5] | Pd° | 0.0147 |

Footnotes to Table 1
[1] obtained from Oxy-Catalyst, Westchester, PA and; BET surface area: 174$m^2$/g.
[2] obtained from Alpha, Danvers, MA; BET surface area: 87.8 $m^2$/g.
[3] obtained from Engelhard Industries, Newark, N.J.; BET surface area: 84 $m^2$/g.
[4] prepared in Example 1.
[5] prepared in Example 3.

Example 4

General Experimental Procedure for Hydrogenation of Nitrobenzene Using Palladium Catalysts A suspension of 25 cc of absolute ethanol containing the specific weight of the catalyst was saturated with helium for 20 minutes in a 3-neck, 100-mL round-bottom flask equipped for magnetic stirring. The stir rate was varied between 300–1200 rpm. The temperature in the hood was fairly constant at ~25° C., and the pressure in the flask was maintained at ~750 mm Hg, absolute. Matheson "Prep" grade hydrogen was bubbled through the ethanol solution using a "B" grade frit to maximize transfer of hydrogen to the catalyst. After a 20 minute purge with $H_2$, 0.5 mL of nitrobenzene (Mallinckrodt, "Analyzed Reagent") was added via syringe through a rubber septum directly into the slurry. Samples (~0.5mL) of the reaction mixture was withdrawn and immediately analyzed via g.l.c. on a ¼-in O.D., 4-ft, SS column packed with 10% Pennwalt 223 with 10% KOH on Gas Chrom R (Applied Science Laboratories); at 145° C. with 55 cc/min of helium, the retention times (in minutes) were as follows: methanol (0.3), ethanol (~0.4), cyclohexylamine (0.8), aniline (2.1), nitrobenzene (3.4), and dicyclohexylamine (7.4). The results are summarized in Table 2.

TABLE 2

Hydrogenation of Nitrobenzene to Aniline with Various Palladium/$Al_2O_3$ Catalysts at 25° C. and 1 atm of $H_2$ pressure[a]

| Catalyst | Weight of Catalyst (mg) | Rate[b] (mmol. $hr^{-1}$) |
|---|---|---|
| Pd/$Al_2O_3$ powder (Alpha)[1] | 5 | 1.6 |
| Pd/$Al_2O_3$ aerogel (Example 1)[2] | 5 | 1.9 |
| Pd/$Al_2O_3$ aerogel | 2 | 2.1 |

TABLE 2-continued

Hydrogenation of Nitrobenzene to Aniline with
Various Palladium/$Al_2O_3$ Catalysts at 25° C. and
1 atm of $H_2$ pressure[a]

| Catalyst | Weight of Catalyst (mg) | Rate[b] (mmol. $hr^{-1}$) |
|---|---|---|
| (Example 2)[3] Pd/$Al_2O_3$ aerogel | 5 | 2.7 |
| (Example 3)[4] Pd/$Al_2O_3$ powder (Engelhard)[5] | 5 | 2.1 |
| Pd/$Al_2O_3$ xerogel (Example 7)[6] | 5 | 0.6 |

Footnotes to Table 2
[a]Ethanol (25 mL) containing nitrobenzene (0.5 mL); Flow rate of $H_2$ was 17.5 $cm^3$/min; Stir Rate was 300 rpm.
[b]Slope % $C_6H_5NO_2$ /hr; 2.4% $C_6H_5NO_2$ was initially present.
[1]5% Pd on $Al_2O_3$ powder having; BET surface area = 87.8 $m^2$/g obtained from Alpha, Danvers MA #89110.
[2]5% Pd on $Al_2O_3$ aerogel prepared by the procedure of Example 1 BET surface area = 328 $m^2$/g.
[3]2% Pd on $Al_2O_3$ aerogel prepared by the procedure of Example 2; BET surface area = 642 $m^2$/g.
[4]5% Pd on $Al_2O_3$ aerogel prepared by the procedure of Example 3; BET surface area = 134 $m^2$/g.
[5]5% Pd on $Al_2O_3$ powder having BET surface area = 84 $m^2$/g obtained from Engelhard.
5% Pd on $Al_2O_3$ xerogel having BET surface area = 422 $m^2$/g prepared by the procedure of Example 7.

Example 5

Nickel Oxide/Silica/Alumina Aerogel Preparation

Nickel acetate tetrahydrate (11.5 g) was dissolved in 115 mL of warm methanol to give solution A. Tetramethyl orthosilicate (3.68 g) and aluminum sec-butoxide (2.34 g) were mixed to give a miscible liquid (solution B). Freshly prepared solutions A and B were promptly combined to form a pasty mass which was stirred until a more fluid slurry was produced. Additional water (3.9 mL) was added, with thorough mixing, to the fluid slurry. The mixture was transferred to a glass liner which was inserted into an autoclave, purged with $N_2$ and heated to about 300° C. under autogeneous pressure. The solvent vapors were vented above their critical temperature. After purging with nitrogen, the bulky aerogel residue was cooled, removed, and a portion calcined at 500° C. in air for 18 hours. The Ni/Si/Al atom ratio was 0.58/0.30/0.12, the BET surface area was 324 and the pore volume was 3.6 $cm^3$/g. Results of the attempted hydrogenation of nitrobenzene with this aerogel are reported in Table 3.

Example 6

Nickel Oxide/Alumina Aerogel Preparation

A solution of nickel acetate tetrahydrate (7.6 g) and 100 mL of methanol was mixed with aluminum sec-butoxide (2.3 g) in 10 mL of sec-butanol to give a premix (65 wgt. % of Ni and 17.3 wgt. % of Al as $Al_2O_3$). After slurry, the premix was a dull green, almost clear solution. The solvents were removed under super-critical conditions in the autoclave of Example 1 at 260° C. The aerogel product was a dense solid having a BET surface area of 58 $m^2$/g and a pore volume of 1.4 $cm^3$/g. The results of the attempted hydrogenation of nitrobenzene with this aerogel are reported in Table 3.

TABLE 3

Hydrogenation of Nitrobenzene to Aniline with
Various Nickel Catalysts at 140°-150° C. and
4893 kPa (710 psig) $H_2$ pressure[a]

| Catalyst (wgt. %) | Temp/ Time °C./(hrs). | Results |
|---|---|---|
| 64% Ni on $SiO_2/Al_2O_3$[1] | 140° C. | Almost complete conversion to aniline with traces of cyclohexylamine |
| 64% NiO on 27% $SiO_2$ 9% $Al_2O_3$ aerogel[2] | 145° C. for 10 hrs. | Only a small amount of aniline was observed; no significant consumption of $H_2$ |
| 64% NiO on 27% $SiO_2$ 9% $Al_2O_3$ aerogel[2] | 150° C. for 6½ hrs.[c,d] | Only a small amount of aniline was observed; no significant consumption of $H_2$ |
| 82.7% NiO on 17.3% $Al_2O_3$[3] | 150° C. for 3 hrs.[c] | A drop of only 60 psig in $H_2$ pressure; only a small amount of aniline was formed |

Footnotes to Table 3
[a]Reaction condition: 0.5 g of catalyst; 75 mL of $C_6H_5NO_2$ in 225 mL of $CH_3OH$ at a stirring rate of 1400 rpm in 1 L Parr Magnadrive ® autoclave.
[b]Hydrogen pressure was 6340 kPa (920 psig).
[c]Aerogel catalyst of Footnote 2 was pretreated with 35 mL/m $H_2$ and 10 mL/m He while the temperature was increased from 145° C. to 400° C. at a rate of 50°/15 min. and the temperature was held at 400° C. under $H_2$ for 6 hrs., then cooled under helium.
[d]150° C. for 2½ hrs. at 4393 kPa and 150° C. for 4 hrs. at 6340 kPa.
[1]Reduced form of powdered nickel (64 wgt. %) on silica-alumina support having BET surface area of 190 $m^2$/g and pore volume of 0.32 $cm^2$/g and obtained from Harshaw Chemical Co.
[2]Nickel aerogel prepared by the procedure of Example 5 calcined at 500° in air for 18 hrs.; BET surface area 324 $m^2$/g, pore volume 3.6 $cm^3$/g.
[3]Nickel aerogel prepared by the procedure of Example 6; BET surface area of 58 $m^2$/g and pore volume of 1.4 cc/g.

Example 7

Pd/Alumina Xerogel

Aluminum sec-butoxide (5.0 g) was dissolved in 10 mL of sec-butanol. Separately, 0.107 g of Pd diacetate was dissolved in 5.0 mL of acetone. Separately 5.0 mL of water was mixed with 5.0 mL of methanol. Call these, respectively, A, B and C. A and B were combined and this resulting liquid was promptly combined with C to form a paste which slowly thinned out with continued mixing (by hand). The mixture was further thinned with 5.0 mL additional methanol and stirred occasionally over one hour. Then the batch was allowed to evaporate overnight naturally and the next day was dried for several hours at 120° C. The resulting Pd/alumina solid had a BET surface area of 423 $m^2$/g and a pore volume of 1.5 $cm^3$/g, values higher than the aerogels of Example 3. The results of the xerogel in the hydrogenation of nitrobenzene are reported in Table 2.

We claim:

1. A catalyst composition comprising a uniform dispersion of individual particles of metallic palladium, substantially free of clusters of said particles, on an alumina aerogel support, said composition having a BET surface area in the range of about 20 to about 700 $m^2$/g, a pore volume in the range of about 1.5 to about 12 $cm^3$/g, a bulk density in the range of about 0.003 to about 0.5 g/$cm^3$ and having a $Pd°/Al_2O_3$ wgt. ratio of about 1:1000 to about 1:5.

2. The catalyst composition of claim 1 wherein said weight ratio is about 1:100 to about 1:10.

3. The catalyst composition of claim 1 wherein the metallic palladium comprises individual particles having diameters in the range of about 0.2 nm to 30 nm.

4. The catalyst composition of claim 3 wherein the alumina aerogel support has a morphology by transmission electron microscopy comprising geometric platelets substantially free of individual particles and wherein the metallic palladium consists essentially of individual particles having diameters in the range of about 2-6 nm.

5. A process of preparing the catalyst composition of claim 1 which comprises:

(a) intimately contacting a solution of a hydrolyzable palladium(II) compound in an aprotic solvent with a solution or dispersion of a hydrolyzable aluminum compound in a $C_1$-$C_5$ alcohol or mixture thereof for a time sufficient to form a mixture of said compounds, substantially free of metallic palladium;

(b) intimately contacting said mixture with a solution of a $C_1$-$C_5$ alcohol and water in an amount sufficient to hydrolyze said aluminum compound and to form a substantially uniform dispersion of metallic palladium and said hydrolyzed aluminum compound in the presence of said $C_1$-$C_5$ alcohol mixture thereof;

(c) heating said uniform dispersion in the presence of the $C_1$-$C_5$ alcohol or mixture thereof to a temperature above the critical temperature of said alcohol or said mixture; and (d) removing said alcohol or mixture thereof under super-critical conditions to form said catalyst composition comprising a uniform dispersion of metallic palladium on an aluminum aerogel support and substantially free of palladium(II).

6. The process of claim 5 wherein in step (a) a solution of palladium(II) acetate in acetone is intimately contacted with a solution or dispersion of an aluminum $C_3$-$C_5$ sec-alkoxide in secondary alcohol having 3-5 carbons.

7. The process of claim 6 wherein in step (a) a solution of aluminum sec-butoxide in sec-butanol is used and wherein in step (b) the $C_1$-$C_5$ alcohol is methanol.

8. The process of claim 6 wherein in step (a) a dispersion of aluminum sec-butoxide in isopropanol is used and wherein in step (b) isopropanol is used.

* * * * *